United States Patent [19]

Karnopp et al.

[11] 3,807,678

[45] Apr. 30, 1974

[54] SYSTEM FOR CONTROLLING THE TRANSMISSION OF ENERGY BETWEEN SPACED MEMBERS

[75] Inventors: Dean C. Karnopp, Davis, Calif.; Michael J. Crosby, Fairview, Pa.

[73] Assignee: Lord Corporation, Erie, Pa.

[22] Filed: Sept. 19, 1972

[21] Appl. No.: 290,302

[52] U.S. Cl. ............... 248/358 R, 188/1 B, 248/20, 267/126
[51] Int. Cl. .......................... F16f 15/08, F16f 11/00
[58] Field of Search.............. 248/358 R, 15, 18, 20, 248/22; 188/1 B; 244/17.25; 267/126, 127

[56] References Cited
UNITED STATES PATENTS

| | | | |
|---|---|---|---|
| 2,055,365 | 9/1936 | Rossman | 188/318 |
| 2,412,277 | 12/1946 | Le Clair | 188/277 |
| 3,483,951 | 12/1969 | Bonesho et al. | 188/1 B |
| 3,509,971 | 5/1970 | Gerstine et al. | 188/1 B |
| 3,606,233 | 9/1971 | Scharton et al. | 248/20 X |
| 3,611,367 | 10/1971 | Billottet | 244/17.25 X |
| 3,477,665 | 11/1969 | Legrand | 248/358 R X |

FOREIGN PATENTS OR APPLICATIONS

610,958  10/1948  Great Britain ..................... 248/20

*Primary Examiner*—J. Franklin Foss
*Attorney, Agent, or Firm*—James W. Wright, Esq.

[57] ABSTRACT

The system is semi-active and includes a passive isolator and an active damper coupled in parallel between spaced members. The damping characteristics of the damper are actively varied as a function of some control condition such as displacement, velocity, acceleration or the like for generating an actively controllable force resistant to relative movement between the members. The system is particularly useful as a suspension system for reducing the transmissibility of shock and vibratory energy between a mass and support therefor.

8 Claims, 9 Drawing Figures

3,807,678

SYSTEM FOR CONTROLLING THE TRANSMISSION OF ENERGY BETWEEN SPACED MEMBERS

BACKGROUND OF THE INVENTION

The elimination or at least reduction in the transmittal of mechanical energy such as shock or vibration between a mass and support therefor is a problem of considerable importance particularly in vehicular suspension systems and in the support of delicate or sensitive equipment. Isolation systems for reducing the transmittal of shock and vibratory energy between a mass and a support are usually positioned in load transmitting or supporting relation between the mass and support. Prior art isolation systems typically include passive isolators, active isolators and combinations of passive and active isolators.

For purposes of the present invention, a passive isolator shall be considered to be an isolation device the performance of which is solely a function of its inherent structural characteristics. Examples include springs and spring-dashpot combinations. An active isolator shall be considered an isolation device which utilizes an additional or external source of energy that is actively controlled to generate desired forces.

Passive isolators support the mass and isolate it in a first frequency range and have a natural or resonant frequency in a second frequency range below the isolation frequency range where vibratory motion of the mass is amplified. These frequency ranges are determined primarily by the stiffness or spring rate of the spring and the mass to be isolated. The undamped resonant or natural frequency of such a system is $\sqrt{K/M}$ where $K$ is the spring rate and $M$ is the mass. The isolation frequency range is considered to be at frequencies normally in excess of the square root of 2 (1.414) times the natural frequency. The passive isolator is designed such that the exciting or disturbing frequency is in this isolation range. Since a passive isolator is subject to amplified excitation in passing through its resonant or natural frequency, harmful effects may be encountered such as damage to the isolated mass or the passive isolator. It is also possible in many instances that a passive isolator cannot be designed for the space available because the static deflection that must be accommodated to have a resonant or natural frequency sufficiently below the exciting frequency is excessive.

Passive isolators may and normally do include some passive damping or energy dissipation characteristics to alter performance thereof. Passive dampers generate forces which are solely functions of the damper design parameters and motions experienced by the damper. Such passive dampers are advantageous at and near the resonant frequency of the passive isolator to reduce amplification. However, damping in the isolating frequency range detracts from the isolating characteristics of the passive isolator. Thus, the selection of damping and the amount thereof in a passive isolator is a design compromise.

Active isolators employ an external energy or power source which supplies energy in a controlled manner to counteract vibrational forces and thus, prevent or at least reduce their transmission. Such active isolators are advantageous in that they can generate forces as a function of the shock or vibratory condition to be controlled. As a result, the system's effective natural frequency can be adjusted to the desired value to provide good isolation. Static deflection can also be controlled. However, these active isolators require a large auxiliary power source, additional equipment to convert power into a convenient form for use such as motors, pumps, reservoirs of hydraulic or pneumatic fluid and servovalves and, furthermore, are not satisfactorily responsive at high frequencies due to the inadequacies of such equipment to rapidly respond to control signals. In addition, such isolators must be carefully designed, maintained and controlled to avoid unstable behavior. Examples of such active isolators are disclosed in Olson, U.S. Pat. No. 2,964,272 and Legrand, U.S. Pat. No. 3,447,665.

Combinations of passive and active isolators of the above type have been proposed such as in Scharton, et al., U.S. Pat. No. 3,606,233 wherein the frequency range of operation of the active isolator is selected to counteract or negate the resonance amplification associated with the passive isolator. The frequency range of operation of the passive isolator is selected to effectively isolate for frequencies above those corresponding to efficient operation of the active isolator. While such a hybrid system eliminates many disadvantages of both the passive and active isolators alone, it still requires a large auxiliary power source and equipment to convert power into a convenient form for use.

Various types of variable shock absorbers or dampers have been employed in suspension apparatus. However, these devices are still to be classed as purely passive. For instance, there are dampers, the damping characteristics of which can be manually adjusted. Other examples include dampers whose damping characteristics are variable through internal structure as a function of stroke. These type variable dampers find their greatest application as shock absorbers wherein the damper can be designed or adjusted to specifically accommodate certain shock conditions. The value of these damper devices for vibration isolation is severly limited by their passive nature.

There are a few instances wherein the characteristics of a damper have been actively shifted between discrete stages as a function of some condition such as position, velocity, acceleration or the like. Examples are illustrated in Wolf, U.S. Pat. No. 2,405,250 and Dickinson, et al., U.S. Pat No. 3,561,574. However, apart from this shifting between discrete stages, the characteristics of these dampers continue to operate primarily as a function of their internal structure and the relative motion between attachement points. That is, they are not capable of being actively controlled for generating a force resistant to the condition to be isolated comparable to that of active isolators.

SUMMARY OF THE INVENTION

With the above in mind, it is an object of the present invention to provide an improved system for controlling the transmission of energy between spaced members and having particular utility as a system for suspending or supporting a mass in relation to a support while reducing the transmission of both shock and vibratory energy therebetween which includes a passive isolator and an active damper that requires only a relatively small external power source and only a limited amount of additional equipment for its operation and control.

It is a further object of the present invention to provide an isolation system for reducing the transmission of shock and vibratory energy between a mass and support which includes a passive isolator and an active damper for generating a controllable force resistant to relative motion between the mass and support.

Another and still further object of the present invention is to provide an isolation system including a passive isolator and an active viscous damper wherein the damping characteristics of the viscous damper are controlled independently of the relative velocity across the damper.

Briefly, the system of the present invention in its preferred embodiment includes a passive isolation means coupled in load transmitting relation between a mass and support for providing resilient support for the mass while reducing transmission of shock and vibratory energy at least in a frequency range in excess of the natural frequency of the system. An active damper is coupled in parallel with the passive isolation means between the mass and support and includes means for actively controlling its resistance to relative movement between the mass and support. Sensor means is operatively associated with the mass and/or support for sensing or monitoring a control condition and generating signals indicative of that condition. Signal control means receives the signals, processes them and generates a control or command signal that is fed to the damper. The damper is responsive to this command signal to continuously control the resistant force generated thereby. The active damper is preferably constructed and/or operated to function virtually independently of the rate of relative motion across the damper.

Various conditions of shock and vibration may be monitored from which the active damper may be controlled. Conditions including position, force, velocity, acceleration and combinations thereof can be monitored in an absolute or relative sense. Through proper monitoring and conditioning of signals, the transmissibility characteristics of the isolation system can be actively controlled to provide a highly satisfactory suspension system without the need for a large auxiliary power source or the equipment necessary to convert that power into a convenient form for use as is required when using conventional active isolators. For instance relative to the passive isolation means alone, the system is capable of providing increased isolation in the isolation frequency range of the system, increased attenuation at and below the resonant or natural frequency of the system and creating an apparent lower natural frequency system without compromising static stiffness.

BRIEF DESCRIPTION OF DRAWINGS

Some of the objectives of the invention having been stated, other objects will appear as the description proceeds when taken in connection with the accompanying drawings, in which.

DETAIL DESCRIPTION OF INVENTION

Figure 1:
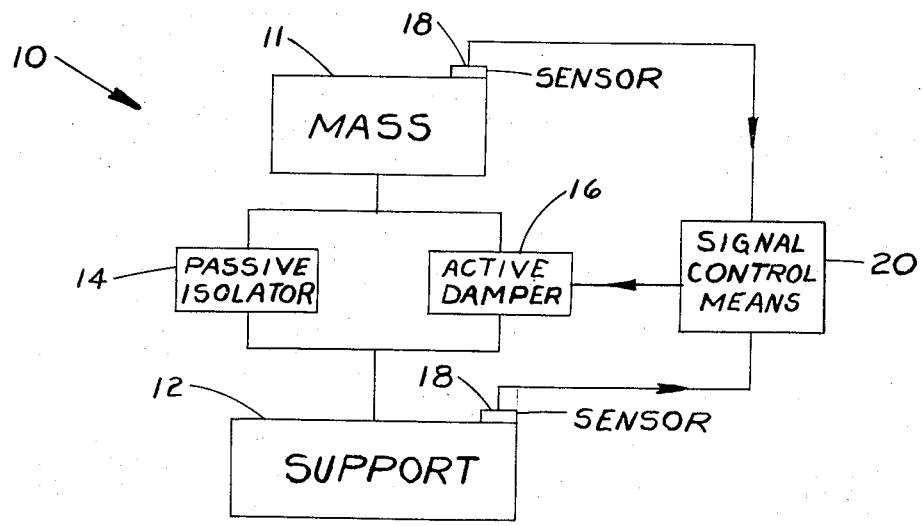
FIG. 1 is a block diagram of an isolation system according to the present invention.

With reference to the various Figures wherein like reference characters are employed where possible to indicate like parts, there is shown in FIG. 1 a block diagram of an isolation system, generally indicated at 10, of the present invention. The isolation system 10 resiliently supports a mass 11 to be isolated relative to a support 12 while reducing the transmissibility of mechanical energy in the form of shock and vibration therebetween. The manner in which the mechanical energy is introduced into the system is not deemed material for purposes of the present invention. It will be apparent that the isolation system can be equally well employed to suspend rather than support the isolated mass. The isolation system will be described for operation with regard to a system having a single translation degree of freedom along a vertical axis. The invention can be equally well applied to systems having additional degrees of freedom. It will also be apparent that the system of the present invention may be employed for many applications other than suspension systems where it is desired to control the transmission of energy between spaced members.

The isolation system 10 comprises a passive isolator 14 and an active damper 16. The passive isolator 14 is coupled in load-carrying or load transmitting relation between the mass 11 and support 12 and resiliently supports the static weight of the mass 11 within allowable deflection limits. It is also highly desirable that the passive isolator 14 have a spring rate which will provide isolation for the mass 11 in the operating or exciting frequency range of the system. The ability to provide this spring rate will determine to a large extent the manner in which the active damper 16 must be actively controlled. However, in any event, the passive isolator 14 must provide static support for the mass 11. Thus, the passive isolator 14 provides both support and isolation for the mass 11 at least beyond a certain frequency which is determined by the resonant or natural frequency of the system 10.

Many passive isolators include damping which affect transmissibility or isolation. Most passive dampers such as passive viscous dampers, as previously indicated, perform or react inherently as a function of the motion across the damper. Such a passive damper favorably reduces the magnitude of amplification in the frequency range at and near the resonant or natural frequency of the system while unfavorably reducing isolation in the isolation frequency range. In accordance with the present invention, it is preferred that the passive isolator 14 be free or nearly so of damping in order to obtain maximum benefits from the passive isolator 14 in its isolation frequency range.

The active damper 16 is coupled in parallel with the passive isolator 14 between the mass 11 and support 12 whereby it will see the same motions as that seen by the passive isolator 14. The active damper 16 is externally controllable, preferably independent of the motions seen by the damper, for actively regulating its damping characteristics. By actively regulating the damping characteristics of the damper, it can generate controllable counteracting forces within limitations to be discussed and cooperate with the passive isolator 14 to effectively regulate the transmissibility characteristics of the system 10.

Active dampers 16 of various types such as viscous, electro-viscous, frictional, electro-mechanical and the like may be designed for use in accordance with the present invention. The manner of control and design of these active dampers 16 will depend not only on the desired effect on transmissibility but the inherent performance characteristics of the damper. For instance, most viscous dampers are inherently dependent on the velocity or rate of relative motion across the damper. Thus to effectively control the performance of such a viscous damper, this characteristic should be considered in designing a satisfactory isolation system 10 in accordance with the present invention. This aspect can be ignored or properly compensated for in the design of the viscous damper and/or in the control mechanism therefor. The performance of a friction damper on the other hand, except under certain conditions, is essentially independent of the magnitude of the velocity or rate of motion across the damper.

Sensors 18 are shown mounted on both the mass 11 and support 12 for continuously monitoring various parameters indicative of a shock or vibratory condition such as positions, velocities and accelerations. Depending on whether absolute or relative parameters are being monitored, both of the sensors 18 may not be necessary. It will also be apparent that displacement transducers (not shown) or the like may be employed between the mass 11 and support 12 to monitor parameters such as reltive velocity. Furthermore, a plurality of parameters may be simultaneously monitored. The essence of these sensors 18 is to continuously monitor the desired parameter or parameters and continuously generate signals proportional to the monitored parameters.

The sensors 18 are connected to a signal control means 20 which receives the signals generated by the sensors 18. The signal control means 20 processes these sensor signals in a predetermined manner and continuously generates a control or command signal which is transmitted to the active damper 16 for continuously adjusting its damping characteristics or force required for relative movement across the damper 16 to cooperate with the passive isolator 14 and reduce the transmissibility of the shock or vibratory condition being encountered by the mass 11 or support 12 particularly in the amplification range of the passive isolator 14.

Figure 2:
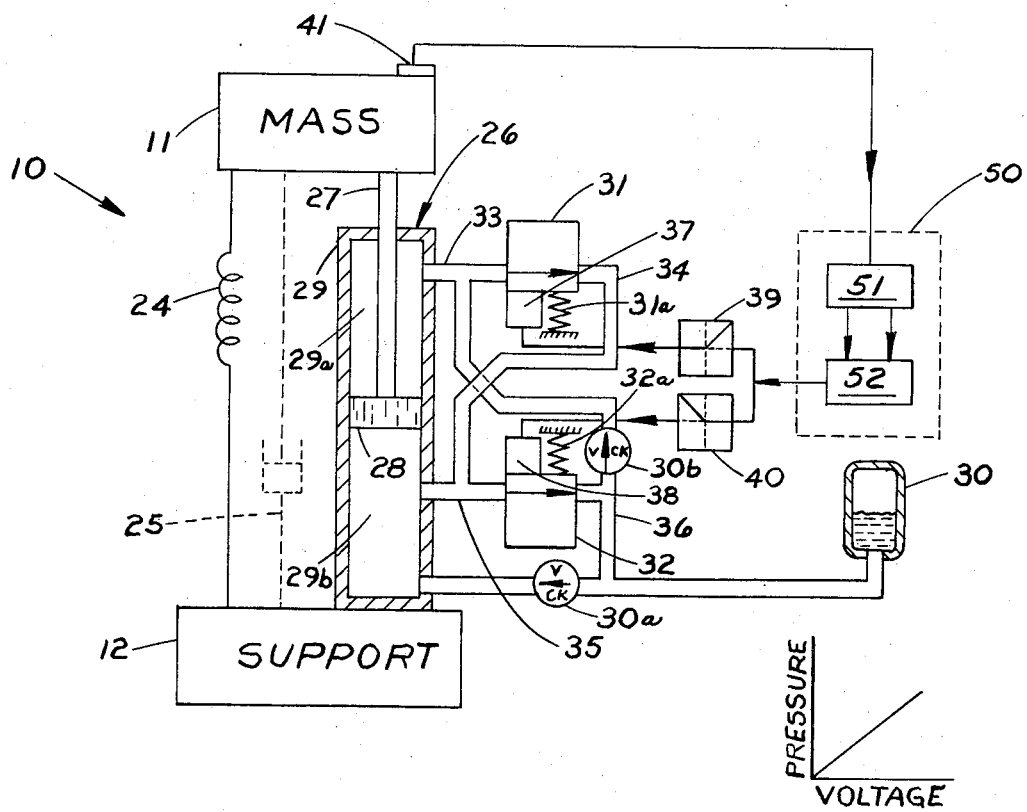
FIG. 2 is a partially schematic and partially block diagram with parts in section of a preferred embodiment of an isolation system according to the present invention.

With reference to FIG. 2, there is shown a preferred embodiment of an isolation system 10 of the present invention. A passive isolator in the form of a spring 24 which may or may not include a passive damper such as a dash-pot 25 is coupled in load transmitting relation between the mass 11 and support 12. As previously indicated, it is preferred that such a passive damper not be included and that the spring 24 be substantially free of damping.

An active viscous damper, generally indicated at 26, is coupled in parallel with the spring 24 between the mass 11 and support 12. The active viscous damper 26 includes a piston rod 27 connected to the mass 11 and attached to a piston 28. The piston 28 is disposed in a container or hollow cylinder 29 which fits in fluid tight relationship with the cylinder walls and divides the cylinder 29 into spaced chambers 29a and 29b. The end of the cylinder 29 remote from the piston rod 27 is connected to the support 12. The piston 28 is slidable longitudinally of the cylinder 29 in response to relative motion along a vertical axis between the mass 11 and support 12 to respectively change the volume of the cylinder chambers 29a and 29b. The cylinder 29 is filled with a viscous fluid such as oil, air or the like. It is usually necessary to provide a reservoir or accumulator 30 in fluid communication with the cylinder 29 to accommodate the volume of viscous fluid displaced by the piston rod 27 as it enters the cylinder 29. The accumulation may be internal or external, as shown, to the cylinder 29. The accumulator 30 may be eliminated by having the piston rod 27 extend throughout the length of the cylinder 29 whereby movement of the piston 28 does not affect the combined volumes of chambers 29a and 29b.

The chambers 29a and 29b are interconnected for fluid communication by a pair of parallel one way, actively controllable, pressure valves 31 and 32, respectively. More particularly, the input side of valve 31 is connected by conduit 33 to chamber 29a and the output side of valve 31 is connected by conduit 34 to chamber 29b. Likewise, the input side of valve 32 is connected by conduit 36 to chamber 29a. Each of the valves 31 and 32 include passive spring means 31a and 32a, respectively, normally biasing them closed. As will be apparent these spring means make the valves operative in only one direction, the direction indicated by the arrows, for the passage of fluid. The valves 31 and 32 also include actively controllable resilient biasing means 37 and 38 for regulating the pressure-flow or throttling characteristics of the valves in the flow direction. A representative input voltage-output pressure for the pressure valves 31 and 32 is shown in the lower right hand portion of FIG. 2. It is this throttling in the valves that determine the damping and thus, resistant force generated by the damper 26. The controllable resilient biasing means 37 and 38 are regulated by command signal filtering means 39 and 40, respectively. The voltage input and output characteristics of the filtering means 39 and 40 are as shown with the input represented by the horizontal axis and the output by the vertical axis.

An accelerometer 41 is mounted on the isolated mass 11 for continuously monitoring the absolute acceleration of the mass 11 and continuously generating a signal proportional to the acceleration of mass 11. This signal is transmitted to signal control means, generally indicated at 50, which includes sensor signal modifying means 51 such as amplifiers, integrators and the like the output of which is summed by summing circuit 52. In the present instance, the sensor signal modifier 51 includes an amplifier and integrator to continuously convert the sensor signal from accelerometer 41 to a signal proportional in magnitude and sign to the absolute velocity of mass 11. Where additional signals are employed for control purposes, the summing circuit 52 is employed to properly relate the output signals from the signal modifier 51 and generate the desired command or control signal. In this illustration, the command signal will be proportional to the absolute velocity of mass 11 and of the same sign. This command signal is continuously transmitted to the active damper 26 which in response thereto continuously adjusts the resistance to fluid flow between chambers 29a and 29b of cylinder 29. By actively controlling the resistance to flow of fluid between chambers 29a and 29b, the active damper may be commanded to generate a resistant force which in cooperation with the force of spring 24 tend to counteract motions experienced by the mass 11.

It will be apparent that since the damper functions by creating a resistance to movement between the mass 11 and support 12, a force that the damper can create necessitates relative motion between the mass 11 and support 12 and is limited to being in a direction opposite to that of the relative motion. Depending on the manner of control of the damper, the damper may be commanded to provide a force in a direction inconsistent with that available. This is particularly true in the above embodiment where the damper is being controlled as a function of absolute velocity of the mass 11. Thus, when the absolute velocity of mass 11 is in a direction opposite to the relative motion between mass 11 and suport 12, the damper will not be able to provide a force in a direction to counteract the absolute velocity of the mass 11. While this is a limitation of the present invention, this effect is minimized by having the damper provide a substantially zero or non-resistant force under such a condition. This aspect of the present invention may be undertaken either in the design of the active damper 26 or the controls therefor. It should also be mentioned that as long as the mass 11 and support 12 are moving in phase with each other or the support 12 is truely fixed, this limitation of the present invention will not be encountered. The active damper 26 is further limited in that there is a maximum force which it can generate. This force is determined by the inertial forces less the algebraic sum of other forces acting on the mass. The effect of these limitations are considered marginal and will hereinafter be more fully illustrated.

To understand the operation of the active damper 26, let us first assume that the mass 11 and support 12 are moving away from each other such that the viscous fluid is being urged by piston 28 from chamber 29a to chamber 29b. If the absolute velocity of mass 11 is positive or upward, a positive command signal proportional thereto will be continously generated. Filtering means 39 will receive this signal and continuously adjust the pressure-flow or throttling characteristics of valve 31 via biasing means 37 as the viscous fluid flows from chamber 29a through conduit 33, valve 31 and conduit 34 to chamber 29b. If the absolute velocity of mass 11 is negative or downward, that is in a direction opposite to the direction of relative movement, a negative command signal proportional thereto will be continuously generated. Filtering device 39 and biasing means 37 will produce a zero or substantially non-resistant force in valve 31 and except for the small resistance of spring 31a, valve 31 will allow free or unrestricted flow of the viscous fluid from chamber 29a to chamber 29b.

Now let us assume that the mass 11 and support 12 are moving toward each other such that the viscous fluid is being urged by piston 28 from chamber 29b to chamber 29a. If the absolute velocity of mass 11 is positive or upward, a positive command signal proportional thereto will be continuously generated. Filtering means 40 and biasing means 38 will produce a zero or substantially non-resistant force in valve 32 and except for the resistance of spring 32a, valve 32 will allow free or unrestricted flow of the viscous fluid from chamber 29b to chamber 29a. If the absolute velocity of mass 11 is negative or downward, a negative command signal proportional thereto will be continuously generated. Filtering means 40 will receive this signal and continuously adjust the pressure-flow or throttling characteristics of valve 31 via biasing means 38 as fluid flows from chamber 29b through conduit 35, valve 32, and conduit 36 to chamber 29a.

In order to alleviate any substantial contribution from or interference by the accumulator 30, the accumulator 30 is interconnected in parallel between chamber 29b and the output side of valve 32. A conventional ball check valve 30a is disposed between chamber 29b and the accumulator 30 to prevent flow of fluid from chamber 29b bypassing valve 32 and eliminates any spring force contribution from the accumulator 30 during such flow. A similar ball check valve 30b is disposed in conduit 36 which prevents flow of fluid from chamber 29a bypassing valve 31 to the accumulator 30 and likewise eliminates any spring force contribution from the accumulator 30 during such flow. However, as additional fluid is required, it automatically enters chamber 29b through check valve 30a. Excess fluid exits from chamber 29b through valve 32 to the accumulator 30. It should also be mentioned that only a very nominal pressurization of the system will be required which will minimize any preload from the damper 26 and fluid leakage problems.

From the above, it will be apparent that the active damper 26 is operatively such that the resistant force generated thereby is inherently independent of relative movement except when the direction of the desired force is incompatible with the direction of relative movement. If the damper 26 is inherently dependent on the rate of relative motion across the damper, compensation therefor can be provided in the controls therefor. It will also be apparent that the overall performance characteristics of the damper 26 can be readily altered by proper selection of the viscous fluid, cylinder 29 and piston 28 parameters and characteristics of the filtering means 39 and 40 and biasing means 37 and 38.

In order to best understand the performance characteristics of the isolation system of the present invention, reference should be first made to prior art systems; namely, a passive and a hybrid passive-active isolation system.

Figure 3:
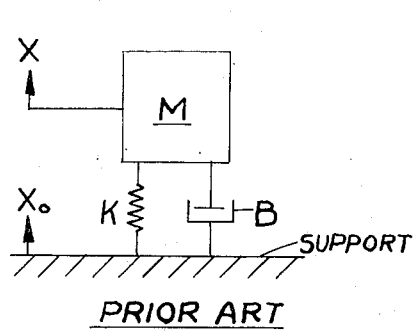
FIG. 3 is a schematic diagram of a conventional prior art passive isolation system.
Figure 5:
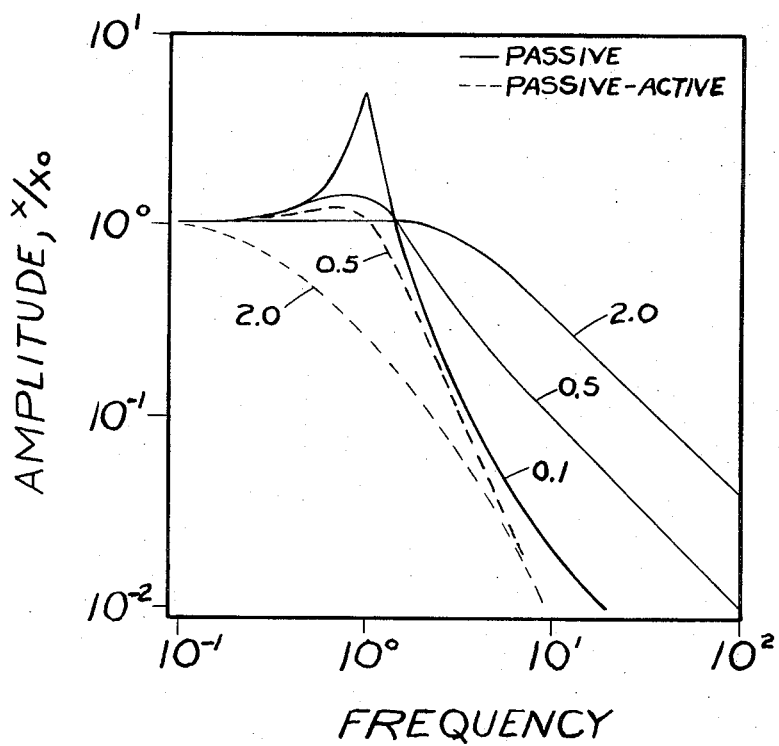
FIG. 5 is a graphic illustration of the transmissibility characteristics of the isolation systems of FIGS. 4 and 5.

With reference to FIG. 3, there is schematically illustrated a conventional passive isolation system. It includes a parallel arrangement of a passive spring having a spring rate K and a passive viscous damper having a damping coefficient B supporting mass M on a support. Assuming the support and mass to be subjected to displacements $Xo$ and $X$, respectively, the transfer function relating these motions is as follows:

$$X/Xo = (BS + K)/(MS^2 + BS + K);$$

where $S$ is the Laplace transform operator. The undamper natural frequency of this system is $\sqrt{K/M}$ and the damping ratio is $B/2\sqrt{KM}$. A transmissibility plot of such a passive isolation system is shown in FIG. 5 for an undamped natural frequency of unity and various damping ratios. In general, the transmissibility plot for the purely passive isolation system shows attenuation or isolation of the mass for frequencies greater than the square root of 2 (1.414) times the resonant or natural frequency (1.0) and amplification at and near resonance. It will be apparent that the resonant amplitude is controlled by the damping ratio. However, this reduction is only obtained through a loss in isolation above resonance, the desired isolation range. Thus, the use of damping in a purely passive isolation system is a design compromise.

Figure 4:
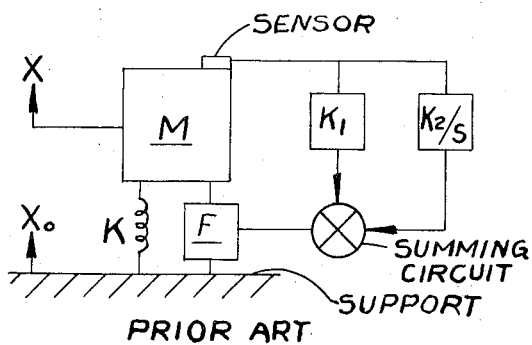
FIG. 4 is a schematic diagram of a prior art hybrid passive-active isolation system.

With reference to FIG. 4, there is schematically illustrated a hybrid isolation system similar to that described in Scharton et al., U.S. Pat. No. 3,606,233. It includes a parallel arrangement of a passive spring having a spring rate K and an active isolator or force generator F supporting a mass M on a support. The acceleration of the mass M is monitored to generate a mass acceleration signal which is amplified, integrated and summed as indicated. The symbol $K_1$ represents the acceleration signal gain. The term $1/S$ represents integration of the acceleration signal to velocity and $K_2$ represents the velocity gain. Assuming the support and mass to be subjected to displacements $Xo$ and $X$, respectively, the transfer function relating these motions is as follows:

$$X/Xo = K/[(M + K_1) S^2 + K_2 S + K];$$

where $S$ is also the Laplace transform operator. The undamped natural frequency of this system is $\sqrt{K/M+K_1}$ and the damping ratio is $K_2/2\sqrt{(M+K_1)K}$. The systems natural or resonant frequency can be regulated by selection of $K_1$ and K can be selected to control static deflection. Also, the value for the damping ratio can be chosen by proper selection of $K_2$. A transmissibility plot for such a suspension having a resonant frequency of unity is also shown in FIG. 5 for various damping ratios. The transmissibility plot of FIG. 5 is also representative of that available from a purely active isolation system.

Relative to the purely passive isolation system, the hybrid passive-active isolation system discussed above allows for improved performance. This improved performance is manifested in that the hybrid system is capable of providing increased isolation in the isolation frequency range of the system, increased attenuation at and below the resonant or natural frequency of the system, and creating an apparent lower natural frequency system without compromising static deflection. However, an active isolator alone or in combination with a passive isolator requires a large power source and complex and expensive equipment to convert this power source into a form suitable for use as previously indicated.

The system of the present invention is quite analogous to that of the hybrid passive-active isolation system just described except that the force generator F has been replaced by an active damper, the only power source being required is that to regulate appropriate control means. The power level for the control means is substantially less than that required for the active isolator. To illustrate the performance characteristics of an isolation system of the present invention, computer simulations thereon have been performed. This simulation was based on modification of the linear characteristics of a hybrid passive-active isolation system to include the nonlinear effect the limitations previously mentioned have thereon. In the example to be described, the control condition was absolute mass velocity. Thus in order to compare to the hybrid passive-active isolation system described above, it was necessary to set acceleration gain, $K_1$ equal to zero. Velocity gains were adjusted to give equivalent damping ratios.

Figure 6A:
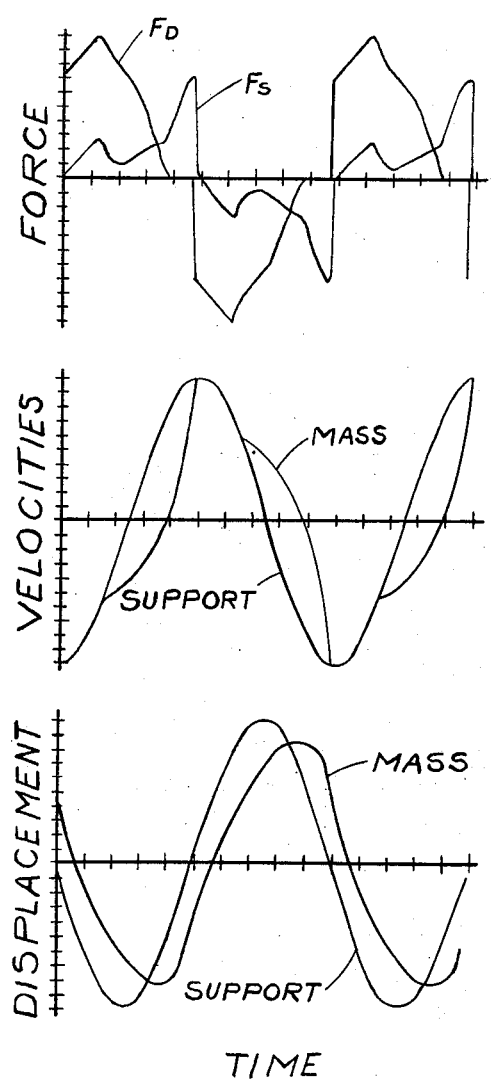
FIGS. 6a and 6b are graphical illustrations of time history plots of damper force, system force, velocities and displacements of an isolation system of the present invention.
Figure 6B:
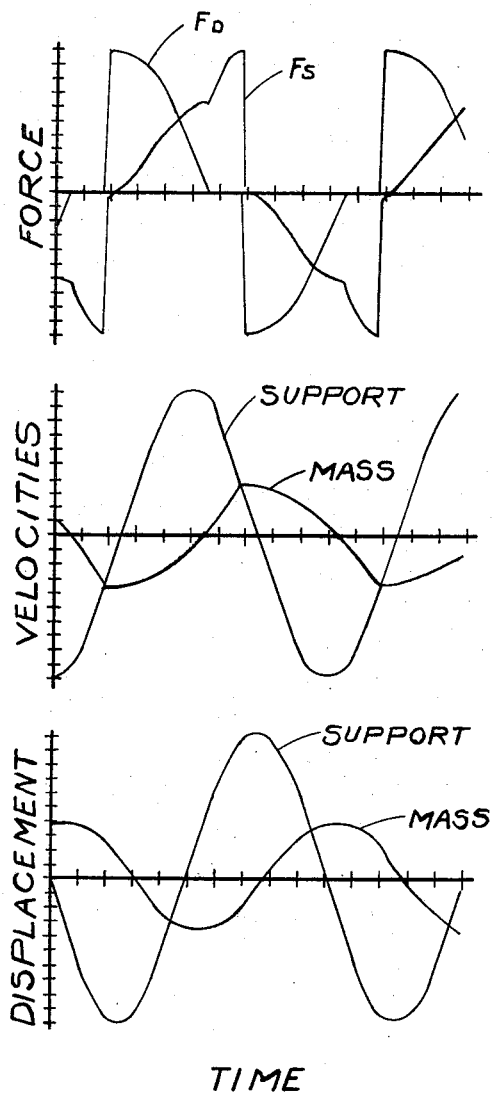

To illustrate the limitations of the present invention, time plots of displacements, velocities, damper output force $F_D$, and total output force $F_s$ are shown in FIGS. 6a and 6b for the indicated frequency and damping ratios. The damper force, $F_D$ versus time plot shows that the active damper turns off or generates a zero force twice during each cycle. By comparison to the velocity plots, it will be noted that during zero damper force output, the relative velocity across the damper is in a direction opposite to the direction of the desired force. The velocity versus time plots also show that velocity for the mass and support are equal during portions of the cycle. This results when the commanded force is in excess of that available from the active damper. Physically, the damper locks or becomes rigid and the force generated thereby is a function of the inertia and other forces acting on the mass. The ability of the system to isolate is to some extent represented by the displacement versus time plots. Little isolation is provided in the plots of FIG. 6a as a result of the frequency ratio of 0.5. However, at a frequency ratio of 1.5 good isolation is obtained.

Figure 7:
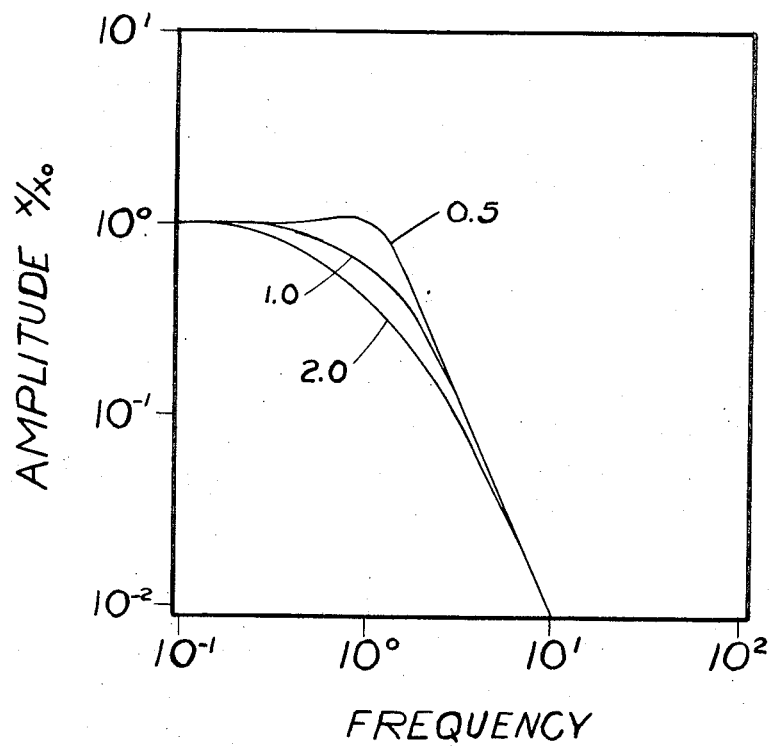
FIG. 7 is a graphical illustraton of the transmissibility characteristics of the isolation system of FIG. 2.
Figure 8:
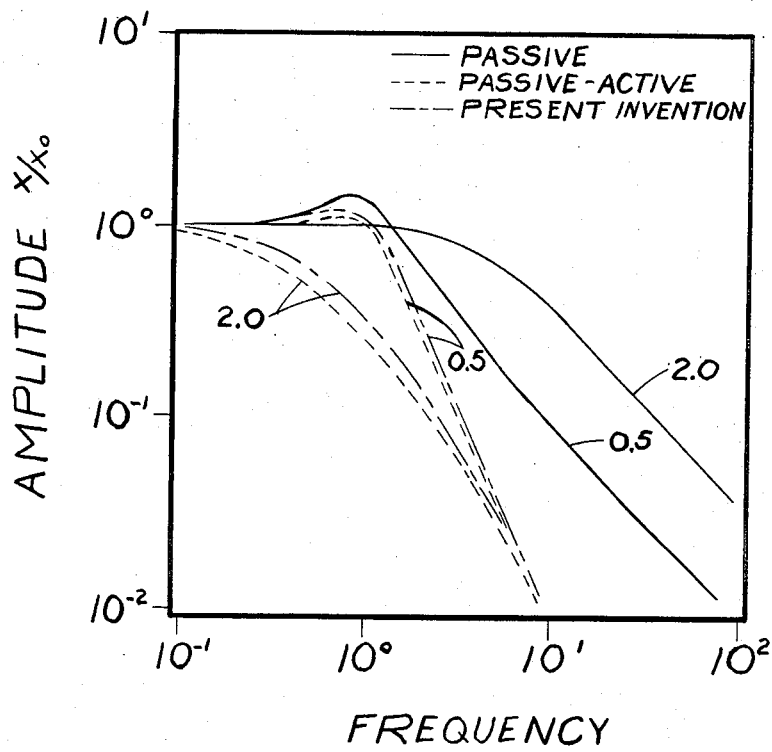
FIG. 8 is a graphical comparison of the transmissibility characteristics of a passive isolation system, a hybrid passive-active isolation system and an isolation system of the present invention.

With reference to FIG. 7, there is shown transmissibility plots for an isolation system of the present invention at several damping ratios. Comparisons between the various systems discussed are shown in FIG. 8. As will be apparent, the performance of the isolation system of the present inventions shows a remarkable improvement over the passive isolation system and approaches that available from an active or hybrid passive-active isolation system. Similar results have been found for random inputs. Accordingly, the semi-active isolation system of the present invention incorporates the advantages of both the passive and active isolation systems in performance without the need for a large external power source and equipment to convert that power into a form for convenient use.

In the drawings and specification, there has been set forth a preferred embodiment of the invention and, although specific terms are employed, they are used in a generic and descriptive sense only and not for purposes of limitation.

What is claimed is:

1. A semi-active system for controlling the transmission of energy between spaced members, comprsing
    passive spring means resiliently coupling the spaced members in force transmitting relation,
    an instantaneously and continuously variable damper coupled in parallel with said passive spring means between the spaced members for generating a controllable force resistant to relative movement between the spaced members, said damper being controllable independently of the motion condition of the damper, sensor means operatively associated with at least one of said members for continously monitoring and generating a signal proportional to a control condition, control means operative independently of the motion condition of said damper in response to said sensor signal for controlling the resistant force generated by said damper upon relative movement between the spaced members.

2. The semi-active system, according to claim 1, wherein said damper is responsive to said control means to selectively generate a controllable force resistant to relative movement between the members when the direction of the force commanded is opposite to the direction of relative movement and a force substantially non-resistant to relative movement when the direction of the force command is the same as the direction of relative movement.

3. The semi-active system, according to claim 1, wherein said damper is viscous.

4. The semi-active system, according to claim 1, wherein said damper is viscous and includes pressure controlled valve means.

5. A semi-active system, according to claim 1, wherein said damper comprises a container, a piston slideably disposed in said container and defining spaced chambers in said container on opposite sides thereof, a viscous fluid filling said chambers, said container being connected to one of said members and said piston being connected to the other of said members for sliding movement relative to said container in response to relative movement between the spaced members, said container and piston being connected between the spaced members in parallel with said passive spring means, pressure controlled valve means interconnecting said spaced chambers in fluid flow communication, said valve means being instantaneously and continuously variable and controllable in response to said control means independently of the motion condition of the damper.

6. The semi-active system, according to claim 5, wherein said pressure controlled valve means comprises a pair of parallel one way, instantaneously and continously variable, pressure controlled valve means interconnecting said spaced chambers in fluid flow communication, said valve means being oppositely disposed with respect to the allowable direction of fluid flow and being controllable in response to said control means independently of the motion condition of the damper, said valve means being responsive to said control means to control the resistance to flow of fluid between said chambers when the direction of the force commanded is opposite to the direction of relative movement and being substantially non-resistant to relative movement when the direction of the force commanded is the same as the direction of relative movement.

7. The semi-active system, according to claim 6, wherein each of said pressure controlled valve means includes filtering means operatively interconnected with said control means for filtering command signals inconsistent with the direction of permissible flow of fluid through said valve means.

8. The semi-active system, according to claim 6, wherein each of said pressure controlled valve means includes passive resilient means normally biasing said valve means closed and instantaneously and continuously variable and controllable resilient biasing means responsive to said control means for further resiliently biasing said valve means closed when the direction of the force commanded is opposite to the direction of relative movement between the spaced members.

* * * * *